United States Patent [19]

Kobayashi et al.

[11] Patent Number: 4,912,422

[45] Date of Patent: Mar. 27, 1990

[54] DEMODULATION SYSTEM FOR PSK SIGNALS WITH LOW CARRIER TO NOISE RATIO AND LARGE FREQUENCY OFFSET

[75] Inventors: Hideo Kobayashi; Teruhiko Honda, both of Tokyo, Japan

[73] Assignee: Kokusai Denshin Denwa Co., Ltd., Tokyo, Japan

[21] Appl. No.: 260,851

[22] Filed: Oct. 21, 1988

[30] Foreign Application Priority Data

Oct. 22, 1987 [JP] Japan .............................. 62-265374

[51] Int. Cl.$^4$ .............................................. H04L 27/22
[52] U.S. Cl. ...................................... 329/306; 375/83
[58] Field of Search ..................... 329/122, 124, 50; 375/52, 53, 57, 83, 84, 55, 56, 85, 86, 87

[56] References Cited

U.S. PATENT DOCUMENTS 4,618,830 10/1986 Mori et al. ................... 329/124 X

OTHER PUBLICATIONS

"A Method of High Precision Frequency Detecton with FFT", Makoto Tabei et al., vol. J 70-A, No. 5, pp. 798–805, May 1987.
"A Calculative Demodulation Method for PSK Signals in Burst Mode", Teruhiko Honda et al., pp. 57–64, Oct. 30, 1987.
"A Demodulation Method by Stored Signal Processing for PSK Burst Signal (I)", Yoshio Takeuchi et al., pp. 7–12, Sep. 29, 1988.
"A Demodulation Method by Stored Signal Processing for PSK Burst Signal (II)", Yoshio Takeuchi et al., pp. 13–18, Sep. 29, 1988.

*Primary Examiner*—Siegfried H. Grimm
*Attorney, Agent, or Firm*—Armstrong, Nikaido, Marmelstein, Kubovcik & Murray

[57] ABSTRACT

A PSK signal which is subject to frequency fluctuation and noise is demodulated by using a regenerated carrier signal and a regenerated clock signal which are derived from the output of bandpass filters (19, 24) for increasing the carrier to noise ratio C/N. The center frequency of bandpass filter is determined by converting the received time domain signal to a frequency domain signal by using a FFT (fast Fourier transform) circuit, and estimating the center frequency on the frequency spectrum based on the fact that the modulated signal component exists only on a portion which has a high level on the frequency spectrum.

4 Claims, 6 Drawing Sheets

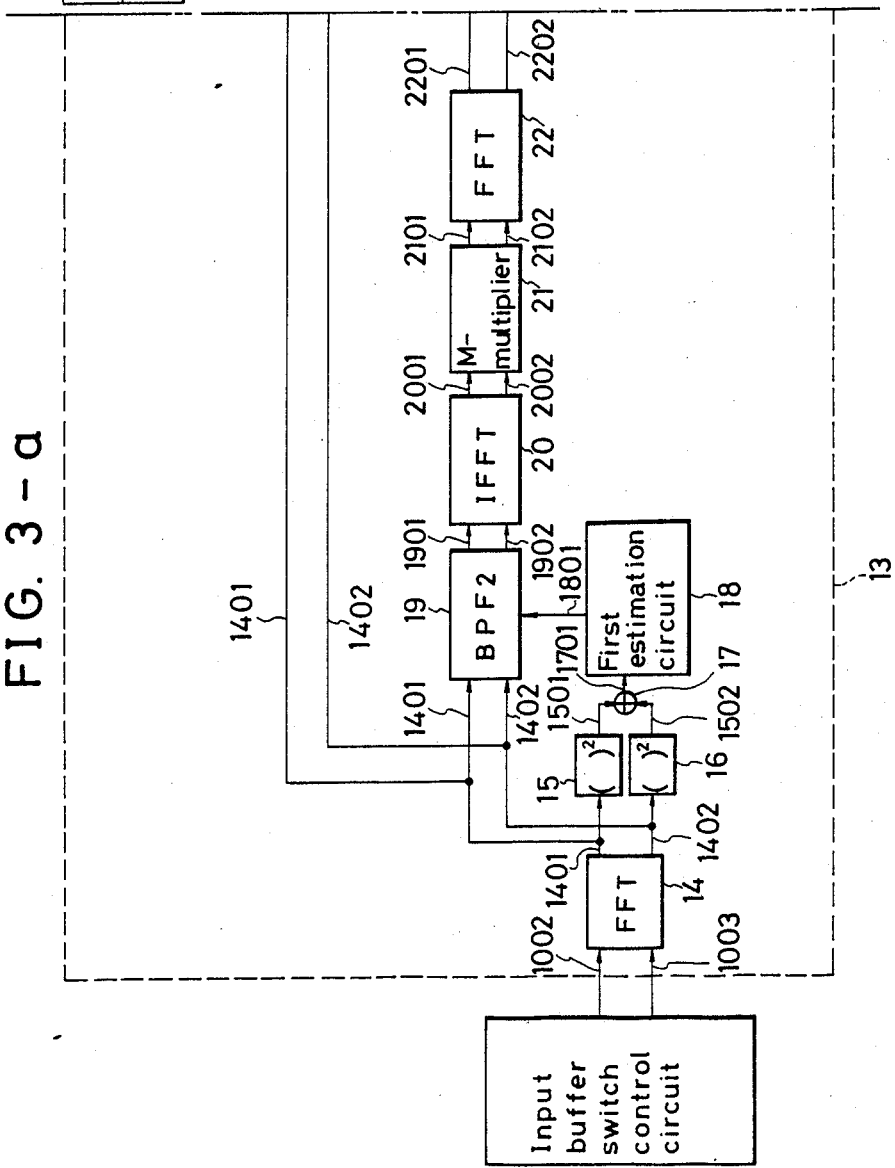

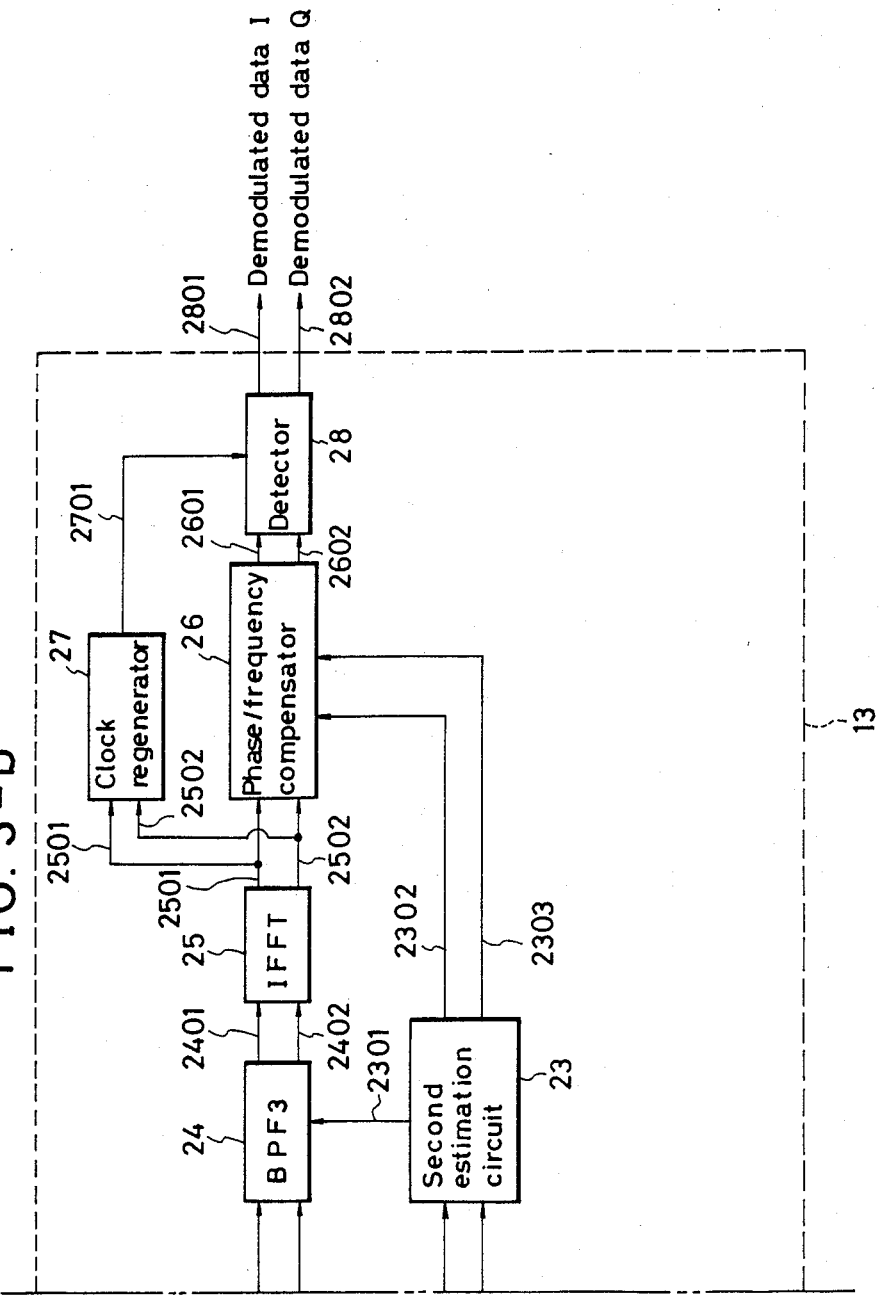
FIG. 3-b

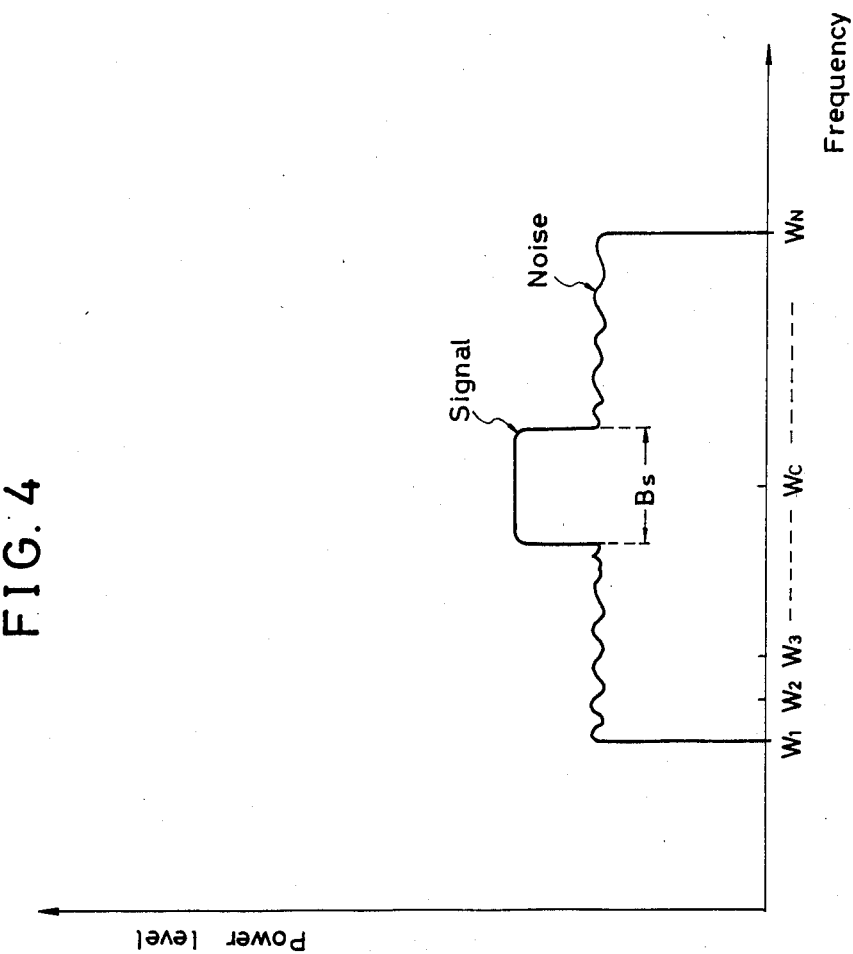

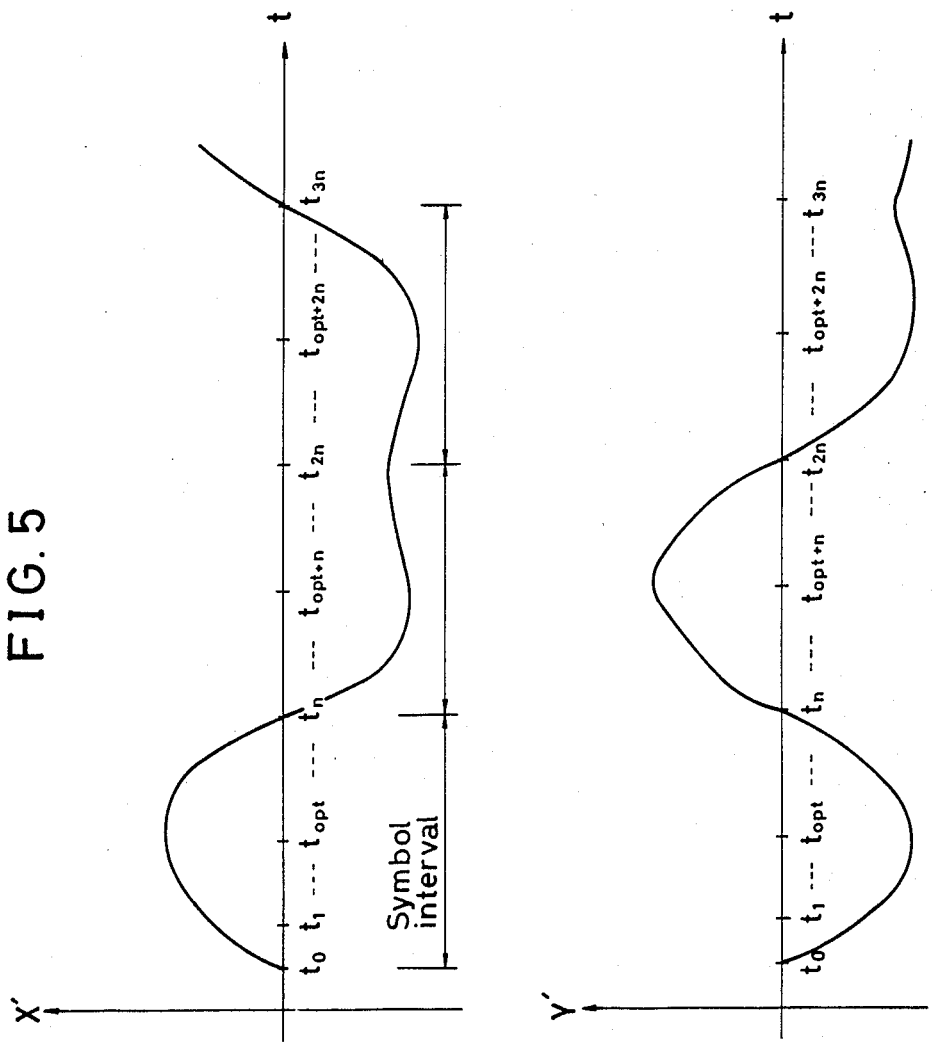

DEMODULATION SYSTEM FOR PSK SIGNALS WITH LOW CARRIER TO NOISE RATIO AND LARGE FREQUENCY OFFSET

BACKGROUND OF THE INVENTION

The present invention relates to a demodulation system for a PSK modulation signal.

Conventionally, a demodulation system for a TDMA (time division multiple access) communication system must establish the synchronization condition within a short time, because the received TDMA signal has a plurality of asynchronous burst signals, and a reference signal must be generated for demodulating each burst. The transmitting side cannot send data until a synchronization is established with the receiving side. A preamble signal for establishing synchronization is attached preceeding the information data in a TDMA signal.

A preamble signal has, as shown in FIG. 1, carrier regeneration data $P_1$, bit timing regeneration data $P_2$ for regenerating a clock signal, and a unique word $P_3$ for frame synchronization.

The length of a preamble depends upon the link quality. When the link quality is poor, and the received C/N (carrier to noise ratio) is low, a preamble must be long, as it takes a long time to establish the synchronization between a received signal and a reference carrier signal for demodulating the received signal.

By the way, in a satellite communication system, the carrier frequency of a received signal is, generally, different from that of the transmit frequency because of the incomplete frequency stability of earth stations, and/or the frequency conversion in a satellite. In case of a low speed digital communication system, which has a narrow bandwidth, the error of the received frequency due to the above reasons is even two or three times that of the bandwidth of the signal. When the TDMA signal has such a large frequency error of even two or three times that of the bandwidth, it takes a very long time for synchronization, and therefore, the preamble in that condition must be very long.

When the carrier to noise ratio C/N is low, and the frequency error is large, the length of a preamble must be long, as described above, and the length of a preamble must be equal to or longer than the data which follows the preamble.

The presence of a long preamble which does not send data decreases the efficiency of a TDMA communication system. In particular, the problem is serious when the data speed is low in a TDMA system.

SUMMARY OF THE INVENTION

It is an object, therefore, of the present invention to overcome the disadvantages and limitations of a prior demodulation system for a PSK signal by providing a new and improved demodulation system for a PSK signal.

It is also an object of the present invention to provide a demodulation system which uses a preamble which has no data for carrier regeneration, and no data for clock regeneration.

It is still an object of the present invention to provide a demodulation system for a PSK signal applicable to a circuit with a low carrier to noise ratio C/N and large frequency deviation.

The above and other objects are attained by a PSK signal demodulation system comprising: an input terminal (100) for accepting a received signal; a first bandpass filter (BPF1; 1) having a bandwidth wider than the bandwidth of the receive signal coupled with the input terminal (100) for passing the receive signal; a local frequency generation means (4,5) having a fixed frequency generator (5) and a phase shifter (4) for providing another local frequency with a predetermined phase relation with the output of said fixed frequency generator; a coherent detection means (2,3) coupled with said first bandpass filter (101) for coherent detection of the received signal using the local frequency; an analog/digital converter (8,9) for converting a coherent detected signal with a predetermined sampling interval; a storage means (11,12) for storing temporarily the output of said analog/digital converter; an FFT (fast Fourier transform) conversion means (14) for converting a time-domain signal stored in said storage means to a frequency domain signal; a first frequency estimation means (18) for estimating the carrier frequency of the received signal using a converted frequency domain signal; a second bandpass filter (BPF2; 19) having a center frequency equal to said first estimated frequency and a bandwidth narrower than that of said first bandpass filter (1) for decreasing the noise component imposed on the received signal; means (20, 21, 22, 23) coupled with the output of said second bandpass filter (19) for regenerating the carrier frequency of the received signal; an IFFT (inverse fast Fourier transform) conversion means (25) coupled with said FFT conversion means (14) for converting a frequency-domain signal to a time domain signal; a clock regeneration means (27) for regenerating a clock signal coupled with the output of said IFFT conversion means (25); a symbol decision means (28) for determining each symbol for the output signal of said IFFT conversion means (25) by using a clock signal from said clock regeneration means (27); and an output terminal (2801, 2802) coupled with the output of said symbol decision means (28) for providing a demodulated output signal.

BRIEF DESCRIPTION OF THE DRAWINGS

The foregoing and other objects, features, and attendant advantages of the present invention will be appreciated as they become better understood by means of the following description and accompanying drawings wherein:

FIG. 4 shows an example of the power spectrum of a signal, and FIG. 5 shows the relation between a sample point and a symbol interval in the time domain.

DESCRIPTION OF THE PREFERRED EMBODIMENTS

Figure 1:
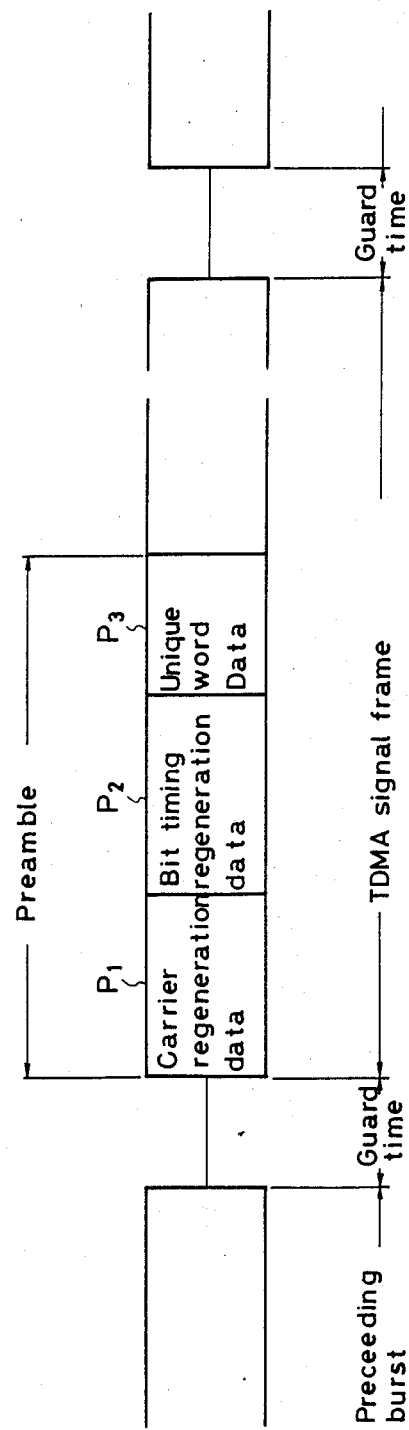
FIG. 1 shows the signal format of a conventional TDMA signal.
Figure 2:
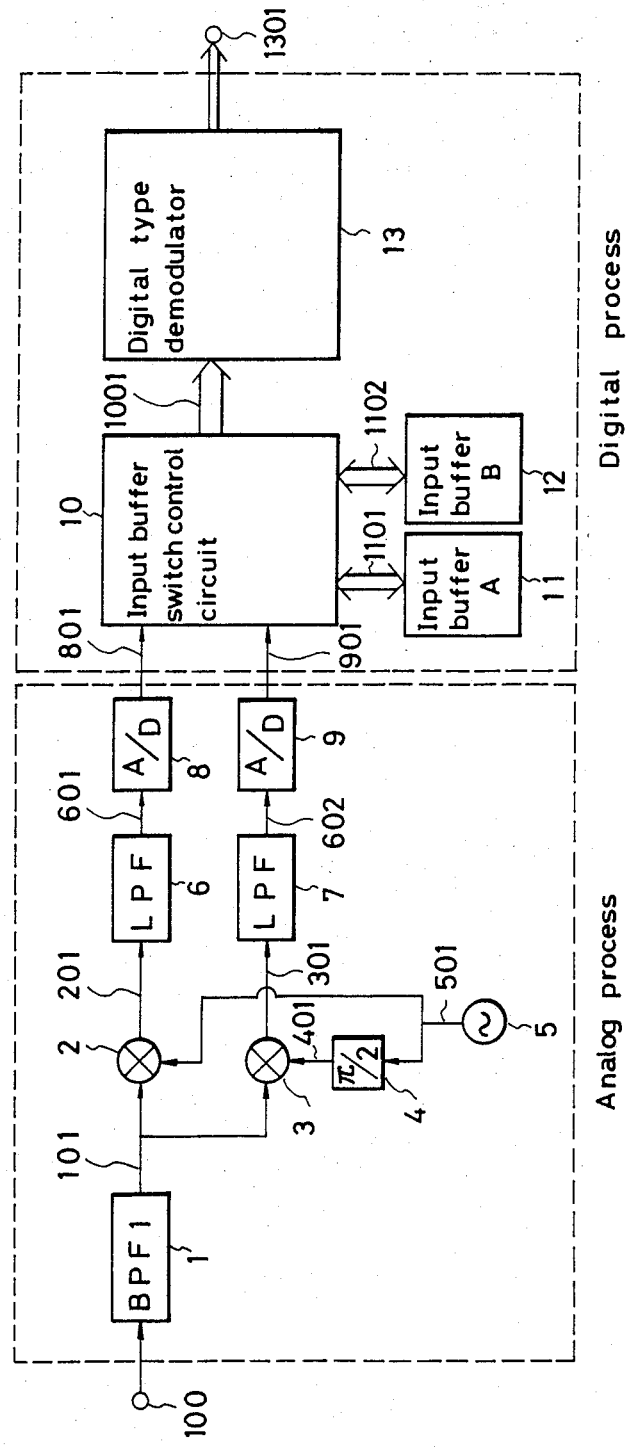
FIG. 2 is a block diagram of a demodulation system according to the present invention, FIGS. 3a and 3b combined show a block diagram of a digital type demodulator 13 in FIG. 2.

FIG. 2 is a block diagram of the demodulation system according to the present invention. The input signal of FIG. 2 is the M-phase PSK (phase shift keying) signal, where M is an integer larger than 2.

The numeral 100 in FIG. 2 is an input terminal to which the M-phase PSK signal is applied, the numeral 1 is a bandpass filter, 2 and 3 are multipliers, 4 is a phase shifter of $\pi/2$ (90°), 5 is a fixed frequency oscillator, 6 and 7 are low pass filters, 8 and 9 are analog-digital converters, 10 is an input buffer switch control circuit, 11 and 12 are input buffers, 13 is a digital-type demodulator, and 1301 is an output terminal which provides the demodulated data output.

The M-phase PSK signal applied to the input terminal 100 is expressed as follows.

$$S_k(t) = \sqrt{2}\, A\cos(W_c't + \theta_k + \theta_0) + n(t) \quad (1)$$

$$(k-1)T \leq t \leq kT$$

The symbol A in the equation (1) shows the amplitude of the received signal, $W_c'$ is angular frequency of a carrier signal, $\theta_0$ is the initial phase, $\theta_k$ is the phase information of the k'th information bit. When the value M is 2 (2 phase PSK signal), the value $\theta_k$ is 0 or $\pi$, and when M is 4, the value $\theta_k$ is 0, $\pi/2$, $\pi$, or $(3/2)\pi$.

The T shows the time for each symbol, and n(t) shows noise imposed on a signal in a transmission line.

The angular frequency $W_c'$ of the received signal in the equation (1) differs generally from the original angular frequency $W_c$ of the transmitting side, because of the frequency stability of the transmit frequency and/or the frequency stability of a frequency converter included in a circuit. Therefore, the frequency error or deviation is $(W_c'-W_c)$. Therefore, the bandwidth of the bandpass filter 1 in FIG. 2 must be wide, considering the maximum frequency deviation in the circuit. For instance, when the frequency deviation is equal to the bandwidth of the signal, the bandwidth of the bandpass filter is approximately three times as wide as the signal bandwidth. Thus, when the frequency deviation of the received signal is large, the bandwidth of the bandpass filter 1 must be wide, and therefore, the wideband noise passes that bandpass filter.

The signal and the noise which pass the bandpass filter are coherently detected using a reference local frequency generated in the fixed local oscillator 5.

The local reference signal generated by the fixed oscillator 5 is expressed as follows.

$$R_s(t) = \sqrt{2}\, \cos(W_c''t + \theta_1) \quad (2)$$

where $W_c''$ is the angular frequency of the fixed oscillator 5, and is close to $W_c$ the angular frequency on a transmitting side. Thus, it is assumed that $W_c$ is equal to $W_c''$ ($W_c = W_c''$) in the following explanation. The value $\theta_1$ in the equation (2) is the initial phase of the local reference signal.

The local reference signal of the equation (2) is changed as follows by the phase shifter 4.

$$R_s(t) = \sqrt{2}\, \sin(W_c t + \theta_1) \quad (3)$$

The multipliers 2 and 3 provide the product of the input signal of the equation (1), and the local reference signals of the equations (2) and (3) at the outputs 201 and 301, respectively, as follows.

$$\begin{aligned} e_1(t) &= S(t) \cdot R_c(t) \quad (4)\\ &= A\cos[(W_c'-W_c)t + \theta_k + \theta_0 - \theta_1] + \\ &\quad A\cos[(W_c'-W_c)t + \theta_k + \theta_0 + \theta_1] + \\ &\quad n(t)\cdot R_c(t) \end{aligned}$$

-continued $$\begin{aligned} e_2(t) &= S(t) \cdot R_c(t) \quad (5)\\ &= -A\sin[(W_c'-W_c)t + \theta_k + \theta_0 - \theta_1] + \\ &\quad A\sin[(W_c'-W_c)t + \theta_k + \theta_0 + \theta_1] + \\ &\quad n(t)\cdot R_s(t) \end{aligned}$$

The harmonic components of the equations (4) and (5) are removed in the low pass filters 6 and 7, respectively, and the resultant signals at the outputs 601 and 602 of the low pass filters 6 and 7 are as follows.

$$e_1'(t) = A\cos[(W_c'-W_c)t + \theta_k + \theta_0 - \theta_1] + n_c'(t) \quad (6)$$

$$e_2'(t) = -A\sin[(W_c'-W_c)t + \theta_k + \theta_0 - \theta_1] + n_s'(t) \quad (7)$$

The terms $n_c'(t)$ and $n_s'(t)$ in the equations (6) and (7) are orthogonal with each other, having the center frequency $(W_c'-W_c)$. They show the noise at the outputs of the low pass filters 6 and 7, respectively. The value $(W_c'-W_c)$ is the frequency error or the deviation between the receive frequency and the local reference frequency, and is indicated as $\Delta W$ hereinafter.

The signals of the equations (6) and (7) are converted to digital form by the analog/digital converters 8 and 9, respectively, as follows.

$$\begin{aligned} X_i &= e_1'(t_i) \quad (8)\\ &= A\cos[\Delta W t_i + \theta_k + \theta_0 - \theta_1] + n_c'(t_i) \end{aligned}$$

$$\begin{aligned} Y_i &= e_2'(t_i) \quad (9)\\ &= -A\sin[\Delta W t_i + \theta_k + \theta_0 - \theta_1] + n_s'(t_i) \end{aligned}$$

where $t_i$ is the i'th sample time, i is an integer from 1 to N, and the duration $t_N - t_1$ is supposed to be equal to the length of a burst signal.

The digital values $X_i$ and $Y_i$ are applied to the input buffer switch control circuit 10, to which a pair of input buffers 11 and 12 are coupled. The input data is first stored in the first input buffer 11, and when N number of digital data for one burst is stored in the first input buffer 11, the content of the first input buffer 11 is transferred to the digital type demodulator 13. The next burst signal is stored in the second input buffer 12. The switching of the first input buffer and the second input buffer is effected by the input buffer switch control circuit 10. The data stored in the first input buffer is processed in the time that the next burst is received, and the processed data thus demodulated is provided at the output terminal 1301. Thus, the TDMA signal is received without interruption by switching the input buffer memories 11 and 12.

FIGS. 3a and 3b show a detailed block diagram of the digital type demodulator 13.

The signals $X_i$ and $Y_i$ which are the outputs of the analog-digital converters are applied to the inputs 1002 and 1003 of the demodulator 13 through the input buffer switch control circuit 10. The data $X_i$ and $Y_i$ are the signals which are processed by the low pass filter 1, which has a relatively wide passband for considering large frequency deviation. The data $X_i$ and $Y_i$ are subject to superposition of the noise $n_c'(t)$ and $n_s'(6)$ in the equations (6) and (7) by the amount defined by the bandwidth of the low pass filter 1.

When the bandwidth of the low pass filter 1 is three times as wide as that of the received signal, the carrier to noise ratio C/N at the output of the low pass filter 1 is worse by 4.7 dB as compared with that of a low pass filter which has a bandwidth equal to that of the received signal. The carrier to noise ratio C/N is degraded as the bandwidth of the low pass filter 1 is increased, and the bandwidth of the low pass filter must be wide when the frequency error or deviation is large. Therefore, when the frequency deviation or the frequency error is large, and the carrier to noise ratio C/N of the received signal is low, then, the ratio C/N of the signals $X_i$ and $Y_i$ must be very low.

The present invention uses the FFT (fast Fourier transform) technique in which the received signal is converted from a time-domain signal to a frequency-domain signal, and is processed in the frequency domain in order to avoid the influence of noise, so as to demodulate the received signal with a low carrier to noise ratio C/N.

The N pairs of digital data ($X_i$, $Y_i$) are converted to a frequency-domain signal from a time-domain signal in the complex FFT (fast Fourier transform) circuit 14. The output of the FFT circuit 14 is the real and imaginary amplitude spectrum in the frequency domain on the output lines 1401 and 1402. Those outputs are applied to the square circuits 15 and 16, and the outputs of those square circuits are applied to the adder 17. Thus, the power spectrum of one burst signal of a TDMA signal is obtained on the output line 1701 of the adder 17.

The power spectrum of a modulation signal which includes noise has the high level power spectrum in a band in which the modulation signal exists. The power spectrum of the noise has the constant level power spectrum in a bandwidth defined by the lowpass filter 1, assuming that the noise is white noise.

FIG. 4 shows the example of the power spectrum, in which $W_1$, $W_2$, $W_3$, ... are discrete frequencies. The interval of the adjacent discrete frequencies is indicated by ($\Delta\epsilon$). It should be appreciated in FIG. 4 that the desired signal which has the correlation with the frequency in the frequency domain has the specific power spectrum which is discriminated from that of the noise which has no correlation with frequency, even in the condition of a low carrier to noise ratio C/N.

The first estimation circuit 18 in FIG. 3a determines the approximate center frequency of the modulation signal. The first estimation circuit 18 obtains first the power sum in a bandwidth which is approximately the same as that of the modulation signal as follows.

$$D_L = \sum_{i=L}^{(m+L-1)} P_i \tag{10}$$

The $D_L$ in the equation (10) shows the power sum in a bandwidth equal to the bandwidth $B_s$ of the modulation signal from the frequency $W_L$. The value m is the number of samples included in the bandwidth of the modulation signal, and the following relationship is satisfied between m, $\Delta\epsilon$, and $B_s$.

$$B_s = m \cdot \Delta\epsilon \tag{11}$$

The value $P_i$ in the equation (10) is the power of the i'th sample.

The power $D_{L+1}$ in the bandwidth $B_s$ from the (L+1)'th sample is shown as follows by using the equation (10).

$$D_{L+1} = D_L + P_{m+L} - P_L \tag{12}$$

It should be noted in the equation (12) that $D_{L+1}$ is calculated by using $D_L$, and the power of $P_L$ and $P_{m+L}$. Therefore, the values $D_{L+2}$, $D_{L+3}$, ... are simply calculated similarly to the equation (12), merely by shifting the subscript of D.

Since the modulation signal exists in the band which has a maximum value of $D_L$ (L=1−(N−m+1)) from the whole frequency band from $W_1$ to $W_N$, the center frequency of the modulation signal is determined by the following equation.

$$L_{MAX} = \underset{L}{MAX} D_L \tag{13}$$

$$L = 1 - (N - m + 1)$$

Therefore, the center frequency $W_r$ of the modulation signal is expressed as follows, by using the equation (13).

$$W_r = W_{LMAX} + (m/2) \cdot \Delta\epsilon \tag{14}$$

As described above, the center frequency $W_r$ of the modulation signal can be correctly determined by using the FFT (fast Fourier transform) method, even when a circuit is very poor.

The received signal is, then, applied to the bandpass filter (BPF2) 19, which has the determined center frequency $W_r$, and the bandwidth equal to that of a conventional receiving filter in a conventional demodulator. In other words, the bandwidth of the bandpass filter 19 is in the range between 1.3 $B_s$ and 1.5 $B_s$, where $B_s$ is the bandwidth of the received signal.

The filter operation in the bandpass filter 19 is carried out by the following calculation which uses the frequency characteristics $B_i$ of the bandpass filter 19 for the complex sampled value ($\eta_i$, $\zeta_i$) of the signal on the lines 1401 and 1402. It is assumed that the frequency characteristics of the bandpass filter (BPF2) 19 has only the amplitude characteristics, or the real part.

$$\eta_i' + j\zeta_i' = (\eta_i + j\zeta_i)B_i \tag{15}$$

$$(i = 1 - N)$$

where $\eta_i'$, $\zeta_i'$ are amplitude spectrum values of real part and imaginary part, respectively, of the i'th sample frequency.

The carrier to noise ratio C/N of the received signal at the output of the bandpass filter (BPF2) 19 is improved by 10 log (bandwidth of BPF1)/bandwidth of BPF2) dB. For instance, when the bandwidth of BPF1 is 5 $B_s$ and the bandwidth of BPF2 is 1.3 $B_s$, the improvement of the carrier to noise ratio C/N is about 6 dB. The bandwidth 5 $B_s$ of the bandpass filter BPF1 allows the frequency fluctuation up to ±2 $B_s$. Even when such a large frequency fluctuation exists, the present invention can demodulate the received signal as if no frequency fluctuation exists, or as if the bandwidth of the BPF1 is 1.3 $B_s$.

The output of the bandpass filter (BPF2) 19 is applied to the inverse fast Fourier transform (IFFT) circuit 20 which converts the frequency-domain signal to a time-domain signal. The converted time-domain signal is applied to the M-multiplier 21, which removes the modulation component to provide the non-modulated signal as shown in the following equation:

$$S_{out}(t_i) = [\sqrt{2} \, A \cos[(W_c' - W_c)t_i + \theta_k + \theta_0 - \theta_1]]^M \tag{16}$$

For example, when the modulation signal is a 2-phase PSK signal, the value $\theta_k$ is 0 or $\pi$, and M is 2. So, the equation (16) becomes as follows.

$$\begin{aligned} S_{out}(t_i) &= A^2 \cos^2[(W_c' - W_c)t_i + \theta_k + \theta_0 + \theta_1] \\ &= \frac{A^2[1 + \cos[(W_c' - W_c)t_i + 2\theta_k + 2\theta_0 - 2\theta_1]]}{2} \end{aligned} \tag{17}$$

The value $2\theta_k$ in the equation (17) is 0 or $2\pi$. So, the modulation component is removed. The output of the M-multiplier 21 is the non-modulated signal having the center frequency $2(W_c' - W_c)$ and the initial phase $(2\theta_0 - 2\theta_1)$.

It should be noted that the output of the M-multiplier 21 has not only the non-modulated signal of the equation (17), but also some noise.

The output of the M-multiplier 21 is applied to the FFT (fast Fourier transform) circuit 22, which converts the time-domain signal to a frequency-domain signal. In the output of the FFT 22, the noise is distributed on the whole frequency band uniformly, and the signal (non-modulated signal) exists at the frequency $2(W_c' - W_c)$. Therefore, the ratio C/N at the frequency $2(W_c' - W_c)$ is considerably improved by the M-multiplier which converts the receive signal to the non-modulation signal, and the discrimination of the noise becomes possible even in the low C/N condition.

Even when the frequency fluctuation $2(W_c' - W_c)$ is large, the frequency $2(W_c' - W_c)$ can be determined, since the present invention uses the FFT technique. However, when the frequency fluctuation $(W_c' - W_c)$ is determined, it is impossible to estimate that value merely by converting the time domain signal at the output of the M-multiplier 21 to the frequency domain signal, because the FFT using the discrete samples can only provide the discrete frequency spectrum samples. In other words, the estimated frequency has an error depending upon the frequency interval $\Delta\epsilon$ of the discrete frequency samples.

If we try to decrease the value $\Delta\epsilon$ in order to reduce the error, we must take a lot of samples. However, when $\Delta\epsilon$ is small, it takes a long time for the FFT calculation, and the memory for storing the digital value of the reeive signal must be large. So, that approach is not desirable in view of the simple structure of an apparatus.

In order to solve the above problem, the present invention estimates the frequency and the phase by using the interpolation to the frequency data obtained in the FFT calculation for a smaller number of data.

According to the present invention, the output of the M-multiplier 21 is converted to the frequency domain signal by the FFT 22. And, the frequency and the phase which have the maximum power on the frequency domain are obtained accurately by using the interpolation calculation.

The more precise input frequency is estimated by the interpolation which is described in "A method of high precision frequency detection with FFT, by Makoto Tabei and Mitsuhiro Ueda, The Journal of the Institute of Electronics, Information and Communication Engineers, Japan, vol. J70-A No. 5 pp. 798–805 (1987-5)".

The interpolation uses the frequency ($W_m$) and the amplitude $X_m$ which have the highest amplitude in the samples on the frequency domain in the FFT output, and the adjacent amplitudes $X_{m+1}$, $X_{m-1}$, and the input frequency $W_e = 2(W_c' - W_c)$ is estimated by using the following equation with a precision higher than $\Delta\epsilon$.

$$W_e = W_m + (1 - 2r)/(1 + r)$$

where $$r = \begin{cases} |X_{m+1}|/|X_m| & (X_{m+1} \geq X_{m-1}) \\ |X_{m-1}|/|X_m| & (X_{m+1} < X_{m-1}) \end{cases}$$

The more precise input frequency is obtained by the above equation by using the discrete frequencies with the resolving power $\Delta\epsilon$.

It is assumed that the determined frequency and the phase are $W_s$ and $\theta_s$.

The bandpass filter (BPF3) 24 is a waveshape filter for decreasing inter symbol interference, and has the center frequency $W_s/2$.

The output of the waveshape filter 24 is applied to the IFFT 25, which converts the frequency domain signal to the time domain signal, which is shown by the following equation.

$$S_i' = X_i' + jY_i'(i=1-N) \tag{18}$$

Next, the output of the IFFT 25 shown by the equation (18) is compensated by using the estimated frequency $W_s$ and the estimated phase $\theta_s$ in the phase/frequency compensator 26 as follows.

$$S_i'' = (X_i' + jY_i')e^{-j(W_s t/2 + \theta_s/2)} \tag{19}$$

The signal expressed by the equation (19) is the baseband signal in which both the frequency fluctuation and the phase fluctuation are compensated for.

Clock information is necessary in order to determine the demodulated data in the baseband signal of the equation (19). The clock signal is regenerated in the clock regenerator 27. The clock signal is obtained as follows by using the time domain signal of the equation (18). The relations of the sample points on the time domain and the symbol interval are shown in FIG. 5, provided that the number of samples is n for every symbol.

The n number of clock phases are obtained. Among them, the best clock timing which provides the least inter symbol interference, is obtained as shown in FIG. 5 at the clock phases $t_{opt}$, $t_{opt+n}$, $t_{opt+2n}$, ... in which the absolute value of the amplitude on a time domain is the maximum, or the eye pattern opens the most. Therefore, the clock timing which opens the eye pattern the widest is obtained by summing the absolute value of the amplitude of each clock phase for one burst for each symbol.

$$q_i = \sum_{j=1}^{L} (X^2_{i+(j-1)n} + Y^2_{i+(j-1)n}) \tag{20}$$

where $i0 - (n-1)$, L is number of symbols in one burst of TDMA signal.

When the value i for providing the maximum value $q_i$ in the n number of values $q_i$ in the equation (20), is I, the clock is the sample point at I, (I+n), (I+2n), ....

Those sample timings provide the best clock phase $t_{opt'}$ $t_{opt+n'}$ ... in FIG. 5. The clock regenerator 27 provides the clock signal according to the above operation.

The clock signal regenerated by the clock regenerator 27 is applied to the code detector 28, which determines the demodulated data, which is the value of the equation (19) at the designated clock point.

As described in detail, according to the present invention, accurate demodulation is possible even under the circumstances of poor C/N and large frequency fluctuation.

Further, when the present invention is used for the demodulation system of a TDMA signal, the carrier regeneration data and the bit timing regeneration data which are essential in a prior TDMA system may be omitted in a preamble. Therefore, the communication efficiency of the TDMA system is improved.

Further, the present invention is applicable to the demodulation of a continuous signal, in particular, it is useful for the rapid phase synchronization of a received signal.

From the foregoing it will now be apparent that a new and improved FSK signal demodulation system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A PSK signal demodulation system comprising:
   an input terminal (100) for accepting a received signal,
   a first bandpass filter (BPF1; 1) having a bandwidth wider than the bandwidth of the received signal coupled with said input terminal (100) for passing the received signal;
   a local frequency generation means (4,5) having a fixed frequency generator (5) and a phase shifter (4) for providing another local frequency with a predetermined phase relation with the output of said fixed frequency generator,
   a coherent detection means (2,3) coupled with said first bandpass filter (101) for coherent detection of the received signal using the local frequency,
   an analog/digital converter (8,9) for converting the coherent detected signal with a predetermined sampling interval,
   a storage means (11,12) for storing temporarily the output of said analog/digital converter,
   an FFT (fast Fourier transform) conversion means (14) for converting the time domain signal stored in said storage means to a frequency domain signal,
   a first frequency estimation means (18) for estimating the carrier frequency of the received signal using the converted frequency domain signal,
   a second bandpass filter (BPF2; 19) receiving inputs from said FFT conversion means having a center frequency equal to said first estimated frequency and a bandwidth narrower than that of said first bandpass filter (1) for decreasing a noise component imposed on the received signal,
   means (20, 21, 22, 23) coupled with the output of said second bandpass filter (19) for regenerating the carrier frequency of the received signal,
   an IFFT (inverse fast Fourier transform) conversion means (25) coupled with said FFT conversion means (14) for converting the frequency domain signal to a time domain signal,
   a clock regeneration means (27) for regenerating a clock signal coupled with the output of said IFFT conversion means (25),
   a symbol decision means (28) for determining each symbol for the output signal of said IFFT conversion means (25) by using a clock signal from said clock regeneration means (27), and
   an output terminal (2801, 2802) coupled with the output of said symbol decision means (28) for providing a demodulated output signal.

2. A PSk signal demodulation system according to claim 1, wherein said carrier regeneration means (20, 21, 22, 23) comprises an IFFT (inverse fast Fourier transform) conversion means (20) coupled with the output of said second bandpass filter (19), means (21) coupled with said IFFT conversion means (20) for converting the signal to a non-modulated signal, an FFT (fast Fourier transform) conversion means (22) coupled with the output of said means (21), a second estimation circuit (23) coupled with the output of said FFT conversion means (22) for estimating the frequency and phase of the received signal by using interpolation of discrete signals of said non-modulated signal.

3. A PSK signal demodulation system according to claim 2, wherein a third bandpass filter (BPF3; 24) having a center frequency determined by said second estimation circuit (23) is provided for passing the output of said FFT conversion means (14), and said clock regeneration means (27) regenerates a clock signal by estimating a sample point in which an amplitude component of the output of said third bandpass filter is at a maximum.

4. A PSK signal demodulation system according to claim 2, wherein said means (21) for converting the signal to a non-modulated signal is an M-multiplier (21) which multiplies the input frequency by M times.

* * * * *